United States Patent
Ghit et al.

(10) Patent No.: US 12,360,995 B2
(45) Date of Patent: *Jul. 15, 2025

(54) MULTI-CLUSTER QUERY RESULT CACHING

(71) Applicant: Databricks, Inc., San Francisco, CA (US)

(72) Inventors: Bogdan Ionut Ghit, Amsterdam (NL); Saksham Garg, Amsterdam (NL); Christian Stuart, Amsterdam (NL); Christopher Stevens, St. Petersburg, FL (US)

(73) Assignee: Databricks, Inc., San Francisco, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 18/221,735

(22) Filed: Jul. 13, 2023

(65) Prior Publication Data

US 2024/0265010 A1   Aug. 8, 2024

Related U.S. Application Data

(60) Provisional application No. 63/483,458, filed on Feb. 6, 2023.

(51) Int. Cl.
*G06F 16/24* (2019.01)
*G06F 16/2453* (2019.01)
(Continued)

(52) U.S. Cl.
CPC .. *G06F 16/24539* (2019.01); *G06F 16/24542* (2019.01); *G06F 16/256* (2019.01); *G06F 16/285* (2019.01)

(58) Field of Classification Search
CPC ......... G06F 16/24539; G06F 16/24542; G06F 16/256; G06F 16/285; G06F 16/24; G06F 16/25; G06F 16/28
See application file for complete search history.

(56) References Cited

U.S. PATENT DOCUMENTS 10,936,589 B1    3/2021   Beitchman et al.
11,308,106 B1 *  4/2022   Muralimanohar ...... G06F 16/27
(Continued)

OTHER PUBLICATIONS

United States Office Action, U.S. Appl. No. 18/222,343, May 6, 2024, 14 pages.

*Primary Examiner* — Maher N Algibhah
(74) *Attorney, Agent, or Firm* — Fenwick & West LLP

(57) ABSTRACT

A multi-cluster computing system which includes a query result caching system is presented. The multi-cluster computing system may include a data processing service and client devices communicatively coupled over a network. The data processing service may include a control layer and a data layer. The control layer may be configured to receive and process requests from the client devices and manage resources in the data layer. The data layer may be configured to include instances of clusters of computing resources for executing jobs. The data layer may include a data storage system, which further includes a remote query result cache Store. The query result cache store may include a cloud storage query result cache which stores data associated with results of previously executed requests. As such, when a cluster encounters a previously executed request, the cluster may efficiently retrieve the cached result of the request from the in-memory query result cache or the cloud storage query result cache.

20 Claims, 10 Drawing Sheets

(51) Int. Cl.
*G06F 16/25* (2019.01)
*G06F 16/28* (2019.01)

(56) References Cited

U.S. PATENT DOCUMENTS

| | | |
|---|---|---|
| 11,429,397 B1 * | 8/2022 | Deokule ............. H04L 67/1095 |
| 2014/0130056 A1 | 5/2014 | Goodman |
| 2015/0254346 A1 | 9/2015 | Chang et al. |
| 2019/0052755 A1 | 2/2019 | Williams |
| 2022/0345463 A1 | 10/2022 | Wu et al. |

* cited by examiner

MULTI-CLUSTER QUERY RESULT CACHING

CROSS-REFERENCE TO RELATED APPLICATIONS

This application claims the benefit of and priority to U.S. Provisional Application No. 63/483,458, filed Feb. 6, 2023, which is hereby incorporated by reference in its entirety.

RELATED FIELD

This disclosure relates generally to cluster computing systems, and more specifically to query result caching for computing systems.

BACKGROUND

A cluster of a data processing service may include a cache which temporarily stores the results of a query operation. As such, if the cluster receives a previously executed query operation, the cluster can efficiently access the cache for the results of the query operation and present it to the user. However, clusters may be frequently terminated based on an automatic stop time or auto-scaling of a data processing service which manages and maintains the clusters. When a cluster is terminated, the associated cache is evicted. Due to this transient nature of clusters and their associated caches, a user may have to execute the query operation again, resulting in a delay in query execution time.

SUMMARY

Embodiments of the present disclosure relates to a multi-cluster computing system which includes a query result caching system. The multi-cluster computing system may include a data processing service and client devices communicatively coupled over a network. The data processing service may include a control layer and a data layer. The control layer may be configured to receive and process requests from the client devices and manage resources in the data layer. The data layer may be configured to include instances of clusters of computing resources for executing jobs. Each cluster having a driver node and a set of executor nodes, the driver node including an in-memory query result cache. The in-memory query result cache is configured to store data associated with results of previously executed requests. The data layer may include a data storage system, which further includes a remote query result cache store and a result file store. The query result cache store may include a cloud storage query result cache which stores data associated with results of previously executed requests. The result file store may include a remote cloud storage configured to store results of previously executed query operations. As such, when a cluster encounters a previously executed request, the cluster may efficiently retrieve the cached result of the request from the in-memory query result cache or the cloud storage query result cache. Hence reducing data processing time for previously executed requests.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (computer-readable medium or method) for purposes of illustration only. One skilled in the art will readily recognize from the following description that alternative embodiments of the structures and methods illustrated herein may be employed without departing from the principles described herein.

Overview

Figure 1:
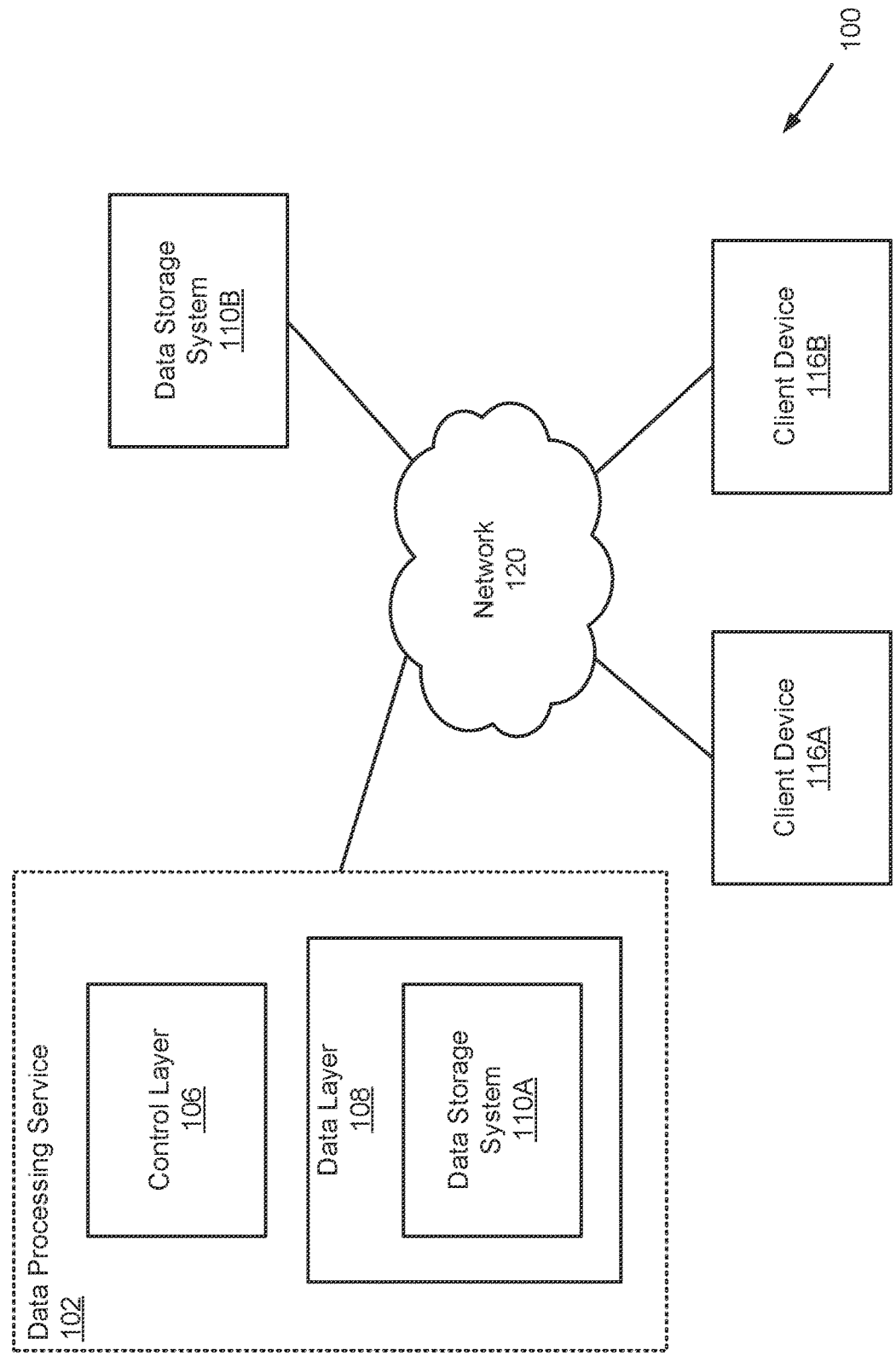
FIG. 1 is a high-level block diagram of a system environment for a data processing service, in accordance with an embodiment.

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100.

The data processing service 102 is a service for managing and coordinating data processing services (e.g., database services) to users of client devices 116A, 116B (collective referred to as 116). The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system is described in relation to FIG. 4. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

In one embodiment, the data processing service 102 may maintain an in-memory query result cache (QRC) in a cluster of the data layer 108 and/or the control layer 106 that can be configured to temporarily store data associated with the results of an executed query. As such, responsive to receiving a previously executed query, the driver node of the cluster can access the in-memory query result cache for the data associated with the results of the previously executed query and present the result to the user with a shorter processing time. However, clusters may be frequently terminated based on a predetermined automatic stop time and auto-scaling of the data processing service 102 which manages and maintains the clusters. When a cluster is terminated, the associated cache is destroyed. Due to this transient nature of clusters and associated caches, a user may have to execute the query again, resulting in a delay in query execution time.

In some embodiments, the data processing service 102 manages and maintains a persistent and remote query result cache (e.g., cloud storage query result cache) in the data storage system 110 of a tenant. The cloud storage query result cache may have a greater storage capacity than the in-memory query result cache. Accordingly, the cloud storage query result cache may be configured to store data associated with the results of all previously executed queries. As such, the driver node may access the cloud storage query result cache to retrieve the results of previously executed queries if the results are not found in the in-memory query result cache. As such, the cloud storage query result cache eliminates the need to re-execute query operations and reduces processing time required to return a result to the user. In an embodiment, the cloud storage query result cache is stored in query result cache store in the data storage system of a tenant.

The control layer 106 may receive, from a client device 116A, a request to perform a query operation. The query operation may be defined by a set of operations on data from one or more data tables which may be stored in the data storage system 110A of a tenant or an external third-party data storage system 110B which is communicatively coupled to the data processing service 102 over the network 120. The control layer 106 may provide instructions to the data layer 108 and/or the control layer 106 to activate and configure a requested number of clusters to perform the query operation and assign the query operation to one or more clusters for execution. Each of the one or more clusters may be configured with a driver node and a set of executor nodes. The driver node may be configured to receive query operations, provide instructions to the executor nodes to perform the operation, and assemble the results of the query operations for presentation to the client device. The executor nodes may be configured to execute the query operation based on the received information from the driver node. The driver node and executor nodes are described in further detail in FIG. 4.

The driver node may compile the requested query operation to generate a logical plan. The logical plan includes representation of the various steps that need to be executed for processing the requested query operation. In an embodiment, the generated logical plan for a requested query operation is used as a cache key. The cache key may be used to associate a query operation to a file or a cache entry in a query result cache which contains the data associated with the results of the query operation. The in-memory query result cache may store data associated with results of previously executed query operations. Accordingly, the driver node may use the cache key to perform a first look up in the in-memory query result cache of the driver node to determine whether the data associated with the result of the query operation is stored in the in-memory query result cache. If the driver node successfully locates the target data in the in-memory query result cache, the data is retrieved, and the result is returned to the client device. In contrast, if the driver node determines that the target data is not stored in the in-memory query result cache, the driver node may access the cloud storage query result cache to perform a second look up for the target data associated with the result of the requested query operation. The cloud storage query result cache may store a plurality of manifest files. A manifest file may include information for retrieving the result of a query operation, for example, the result of a query operation, result file store file paths to the result file, and metadata associated with the result of the query operation. For example, the associated result file metrics may include the result file size in bytes, number of data table rows, and the like. In some embodiments, the hashed representation of the logical plan of the query operation is used to name the manifest files. Accordingly, the hashed representation of the logical plan of the requested query operation can be used to perform the second look up in the cloud storage query result cache. If the driver node determines that the manifest file associated with the requested query operation is stored in the cloud storage query result cache, the result is retrieved by reading the manifest file and returned to the client device. The driver node may download, extract, and format data from the manifest file for presentation to the user on the client device 116.

In contrast, responsive to the driver node determining that data associated with the result for the requested query operation is not stored in the in-memory query result cache or in the cloud storage query result cache, the driver node may instruct one or more executor nodes to execute the query operation. The driver node may assemble the generated results from the one or more executor nodes and provide the result to the client device. The driver node may asynchronously update the cloud storage query result cache with the generated result of the executed query operation. The driver node may generate a logical plan and a cache key for the requested query operation. The cache key may be generated by applying a hash function to the logical plan of the requested query operation. The driver node may generate a manifest file for the requested query operation and store the results of the requested query operation in the cloud storage query result cache. As described above, the manifest file may be associated with the cache key. The manifest file may contain the result of the requested query operation, a result file store file paths to the result file of the requested query operation, and metadata associated with the result of the requested query operation. The driver node may asynchronously update the in-memory query result cache of the driver node with the generated result of the executed query operation. In one instance, the driver node may use the canonical form of the logical plan of the requested query operation as the cache key to the result of the query operation stored in the in-memory query result cache.

In one embodiment, the data processing service 102 is configured with a cloud fetch mechanism that returns query results in different formats depending on a size of the query result. Specifically, when the results of a query are below a predetermined threshold, the data processing service 102 returns the results using a data format, such as Apache Arrow in-memory columnar data format, in-line within an interface of the data processing service 102 accessed by a user of the client device 116. When the results of the query are above the threshold, the data processing service 102 uploads the query results to cloud storage, e.g., the data storage system 110 of the tenant, as one or more result files. In one instance, the data processing service 102 returns a link (e.g., pre-signed URL link) to the client device 116 such that the client device 116 can directly access the result files stored in cloud storage.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or a data management system may be managed by the same entity that manages the data processing service 102.

For example, when the data storage system 110 is managed by the entity managing the data processing service 102, the data storage system 110A may reside within the data layer 108. The data storage system 110A may include dedicated cloud storage for respective tenants of the data processing service 102. In another instance, the data storage system 110B may be external and/or remote to the data processing service 102 in that a different entity manages the data of the data storage system 110B. For example, the data storage system 110B may be located in a remote location from the data processing service 102.

The client devices 116 are computing devices that display information to users and communicate user actions to the systems of the system environment 100. While two client devices 116A, 116B are illustrated in FIG. 1, in practice many client devices 116 may communicate with the systems of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the various systems of the system environment 100 through an application programming interface (API) running on a native operating system of the client device 116, such as IOS® or ANDROID™.

Figure 2:
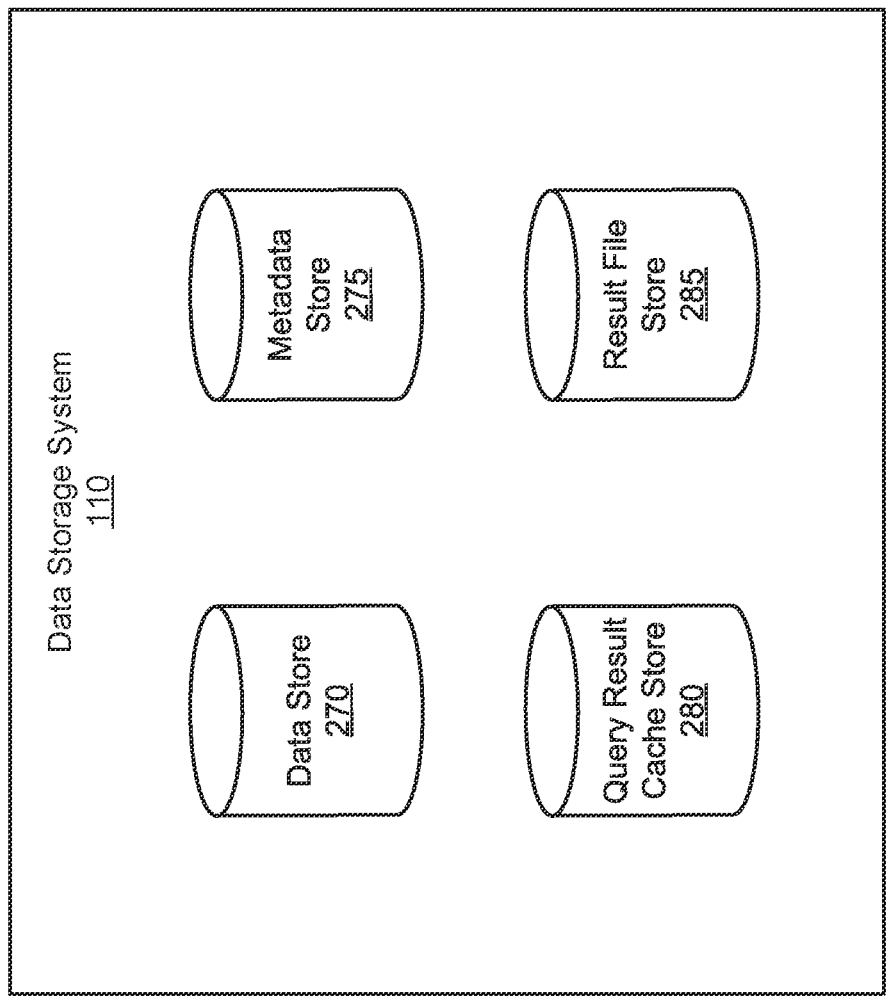
FIG. 2 illustrates a block diagram of an architecture of a data storage system, in accordance with an embodiment.

FIG. 2 is a block diagram of an architecture of a data storage system 110, in accordance with an embodiment. In one embodiment, the data storage system 110 includes a data ingestion module. The data storage system 110 also includes a data store 270, a metadata store 275, a query result cache store 280, and/or a result file store 285.

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110A.

In one embodiment, a new version of the data table is committed when changes of a respective transaction are successfully applied to the data table of the data storage system 110A. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

The query result cache store 280 may be a remote cloud storage configured to store data associated with the results of previously executed query operations. Each tenant of the data processing service 102 has access to a query result cache store 280. The query result cache store 280 may include a persistent cloud storage query result cache. The cloud storage query result cache may store a set of manifest files which include data for retrieving results of a query operation. In an embodiment, the query result cache store 280 may be implemented as a storage resource shared by clusters within a workspace, where users of client devices 116 (e.g., users associated with tenants) can access resources of the data processing service 102. A user associated with a tenant may access a workspace environment through the control layer 106, where users of client devices 116 can access resources of the data processing service 102. The user may create a warehouse within the workspace to execute database operations on data that may be stored in the data store 270. Each tenant may be associated with one or more workspaces, and each workspace may be associated with one or more warehouses. The control layer 106 may initiate one or more clusters within the warehouse to execute query operations, as configured by the user. The one or more clusters which are associated with the same workspace may share access to the query result cache store 280. In some embodiments, clusters associated with different warehouses can share access to the query result cache store 280 if the clusters are associated with the same workspace.

The result file store 285 may be a remote cloud storage configured to store results of previously executed query operations. In one embodiment, regardless of whether the size of the query results is small or large, the result file store 285 may include the results of small or large query operations in the same data format. Moreover, a large result for a query operation may be distributed across two or more result files depending on the size. The result files in the result file store 285 may be written by a cluster computing system.

Figure 3:
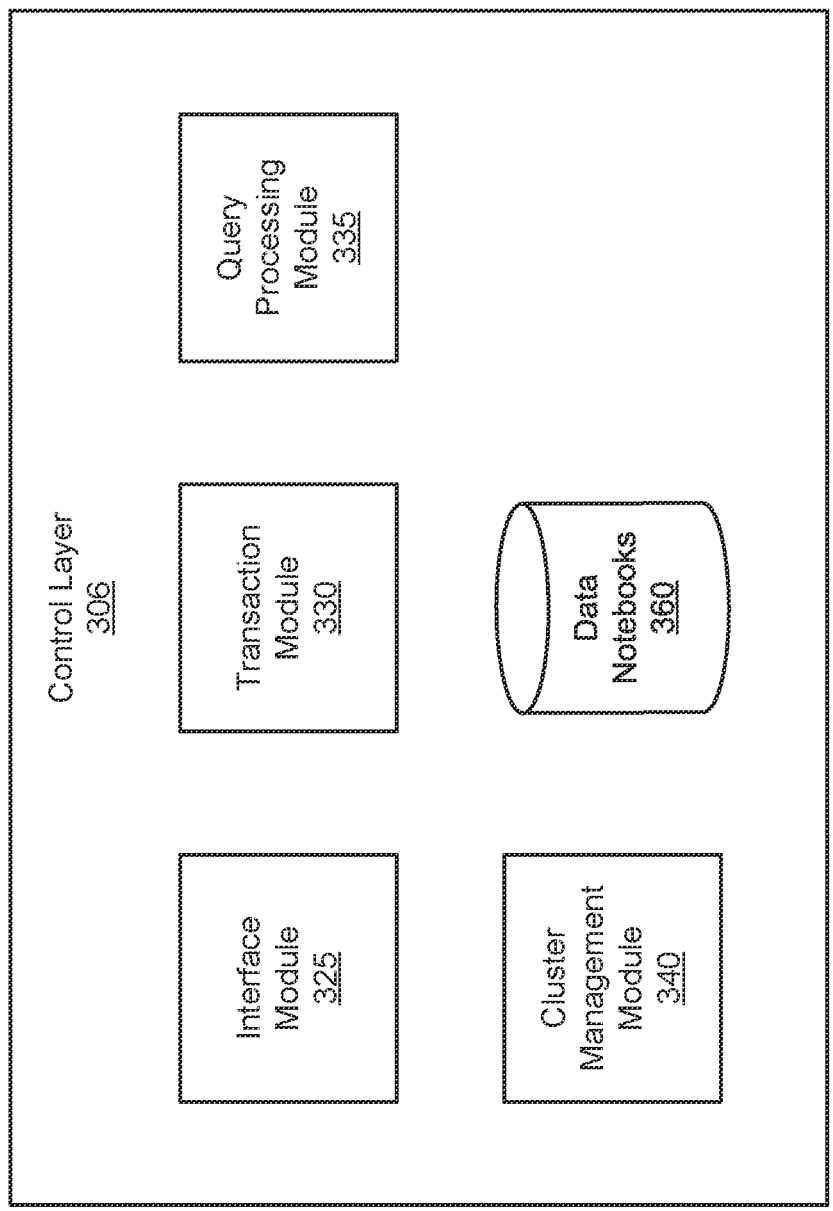
FIG. 3 illustrates a block diagram of an architecture of a control layer, in accordance with an embodiment.

FIG. 3 is a block diagram of an architecture of a control layer 106, in accordance with an embodiment. In one embodiment, the data processing service 102 includes an interface module 325, a transaction module 330, a query processing module 335, and a cluster management module 340. The control layer 106 also includes a data notebook store 360.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. In one embodiment, the query processing module 335 provides one or more queries to appropriate clusters of the data layer 108, and receives responses to the queries from clusters in which the queries are executed.

Figure 4:
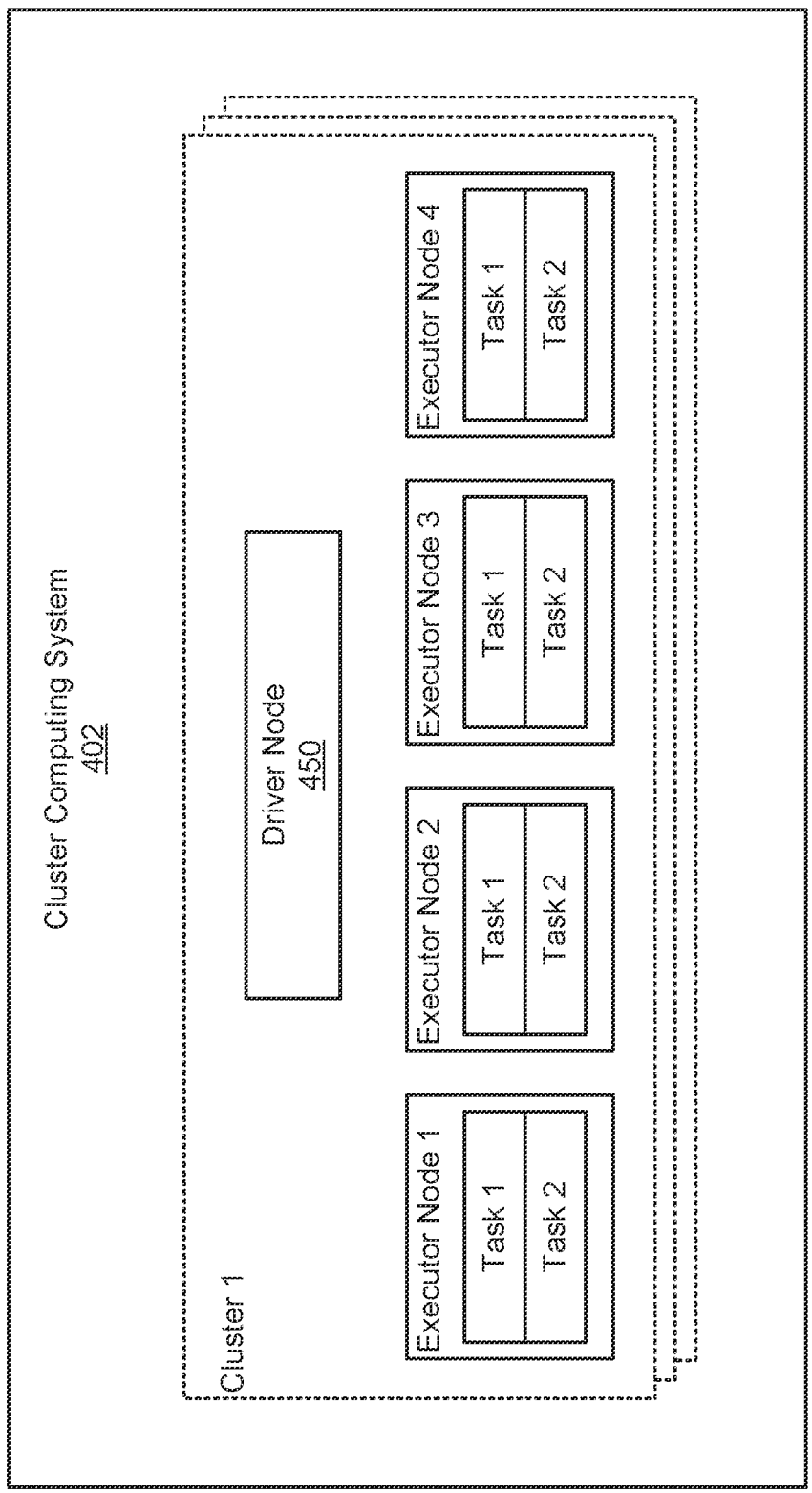
FIG. 4 illustrates a block diagram of an architecture of a cluster computing system of the data layer, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 335. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 450. According to an embodiment, an executor node executes the generated code for the database query for a particular subset of data that is processed by the database query. The executor nodes execute the query based on the received information from the driver node 450.

Cache Hit in Remote Query Result Cache

Figure 5A:
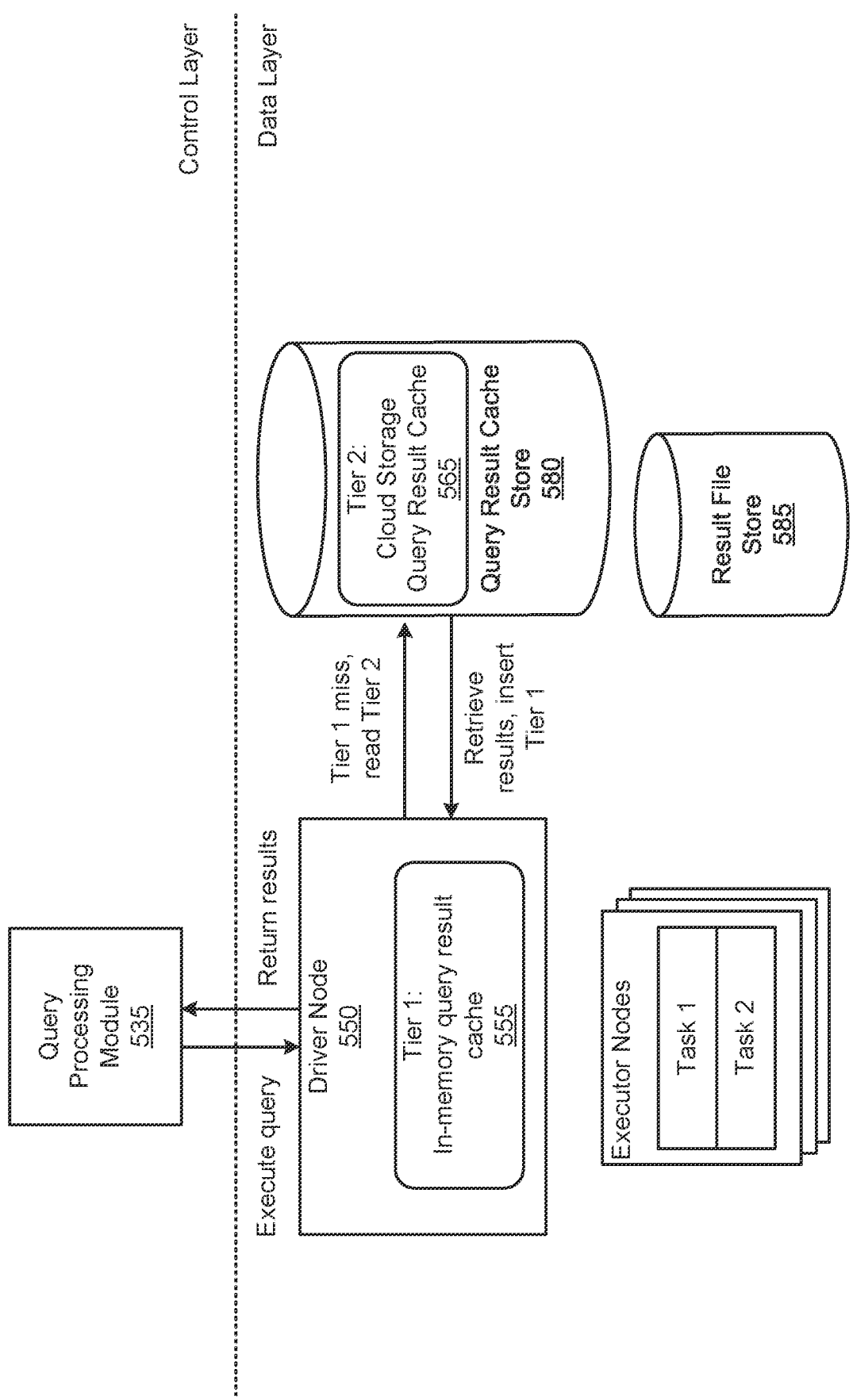
FIG. 5A is a conceptual diagram that illustrates a cache miss in the in-memory query result cache and a cache hit in the cloud storage query result cache, in accordance with an embodiment.

FIG. 5A is a conceptual diagram that illustrates a cache miss in the in-memory query result cache 555 and a cache hit in the cloud storage query result cache 565, in accordance with an embodiment. The query processing module 535 may receive a database query from a client device 116A and may be configured as or substantially similar to the query processing module 335 described in conjunction with FIG. 3. As described in FIG. 3, the query processing module 535 may be configured to process and compile the database query and distribute one or more query operations to clusters in the data layer 108 and/or the control layer 106. In the embodiment illustrated by FIG. 5A, a warehouse with one cluster is depicted.

The driver node 550 of the cluster receives a requested query operation from the query processing module 535 and generates a logical plan for the requested query operation. The driver node 550 may be configured as or substantially similar to the driver node 450 described in conjunction with FIG. 4. The logical plan includes representation of the various steps that need to be executed for processing the query operation. The process for generating a logical plan for the query operation is described in further detail in FIG. 6.

The driver node 550 may use a cache key to perform a look up in the in-memory query result cache 555 to determine if the results of the requested query operation is stored in the in-memory query result cache 555. The cache key is a unique identifier for an object stored in the query result cache and can be used to associate a query operation and the cache entry containing the result of the query operation. In one instance, when looking up the in-memory query result cache, the driver node 550 may use the canonical form of the logical plan of the query operation as the cache key. While some query operations may be different in syntax (e.g., text form), the query operations may be semantically equivalent. As such, dissimilar query operations may be reduced to same logical plan during analysis.

For example, the following query operation determines, for each row in a data table, whether the year field corresponding to a "start_date" is greater than 2021. The resulting rows for which the conditional statement is true, are compiled and reordered in descending order based on the "start_date". The driver node 550 may generate a logical plan for the following query operation.

"SELECT year(start_date),
CASE WHEN year(start_date)>2021 THEN 1
ELSE 0 END,
* FROM [ADS].[dbo].[TestTable_v1] order by start_date desc"

The driver node 550 may obtain a cache key from the logical plan generated for this query and store the manifest file in the query result cache store and also cache the result in in-memory cache. In this manner, when the request is made again in the future, the driver node 550 can obtain the cached results (either in in-memory or query result cache store) and return the result quickly to the user. However, when the table is updated to "v2," and changes are made to the table, a different cache key may be generated and the driver node 550 will have to execute the new query.

Specifically, the driver node 550 may perform a first look up in the in-memory query result cache 555 of the driver node 550 using the cache key to determine whether the results of the requested query operation is stored in the in-memory query result cache 555. As described in FIG. 1, the in-memory query result cache 555 of the driver node 550 may store results of previously executed query operations. The in-memory query result cache 555 may be limited in storage capacity. As such, in some embodiments, the in-memory query result cache 555 may be configured to only store the results of most recently executed query operations. In other embodiments, the in-memory query result cache 555 may store the results of most frequently executed query operations. In some embodiments, the driver node 550 may pre-warm the in-memory query result cache on cluster start-up by pre-fetching a plurality of most frequently fetched results from the cloud storage query result cache 565.

In some embodiments, the in-memory query result cache may store the result of a query operation, or result file store 585 file paths to one or more result files associated with a query operation based on the size of the result file. As described in conjunction with FIG. 1, a result of a query operation may be classified as a small result or a large result, based on a predetermined threshold file size (e.g., 5 MB, 10 MB, 20 MB, etc.). For example, for small results, the result of the query operation may be directly stored in the in-memory query result cache 555 in association with the query operation. For large results, the file paths to the result files may be stored in the in-memory query result cache 555 in association with the query operation. Responsive to the driver node 550 successfully locating the result of the requested query operation in the in-memory query result cache 555, the driver node 550 retrieves the result data (e.g., result of query operation or result file store 585 file path to the result file) from the in-memory query result cache 555 and returns the result data to the query processing module 535. The query processing module 535 receives the result data from the cluster and may send the data to the interface module 325 for presentation to the user. In one embodiment, when the cloud fetch mechanism is enabled, the driver node 550 generates a pre-signed URL link to the result files in cloud storage to the query processing module 535, such that the requesting user can access the results stored in cloud storage via the URL. For small results, the driver node 550 may read the cache results, and return the query results in-line within an interface generated by the data processing service 102. However, it is appreciated that in other embodiments, large results can also be provided in-line to the client device by reading the result files and reconstructing the results.

In contrast, if an in-memory query result cache 555 miss occurs, the driver node 550 may access the query result cache store 580 to perform a second look up in the cloud storage query result cache 565 to determine if the result of the requested query operation is stored in the cloud storage query result cache 565. The cloud storage query result cache 565 stores a plurality of manifest files. A manifest file may include one or more file paths to result files associated with the query operation, and metadata associated with the result of the query operation.

In some embodiments, the contents of the manifest file may be determined by the size of the result file. For example, the manifest files for large results may contain file paths which direct to a location in the result file store 585 where the result files for the query operation are stored. The metadata may include result file metrics such as the result file size in bytes, data table identifiers and versions, and result format (e.g., cloud format for large files). The manifest files for small results include file paths which direct to a location in the result file store 585 where the result file for the query operation is stored. The metadata may include file metrics and result format (e.g., Apache Arrow for small files).

The manifest file may be associated with a cache key. For example, the manifest file may be named using the cache key. In some embodiments, the cache key is a hashed representation of the logical plan of the query operation. The driver node 550 may apply a hash function on the logical plan of the requested query operation to determine the cache key. The driver node 550 may use hash functions such as the secure hash algorithm (SHA), MD5, Murmur, and the like.

Accordingly, the driver node 550 may compute the hashed logical plan of the requested query operation to perform the second look up in the cloud storage query result cache 565. If the driver node 550 determines that the manifest file associated with the result of the requested query operation is stored in the cloud storage query result cache 565 (i.e., "cache hit"), the driver node 550 downloads the manifest file from the cloud storage query result cache 565 and reads a result format from the manifest file.

The driver node 550 determines the representation of the result that is returned to the user based on the result format. The result format may include an arrow result format and a cloud result format. The result format associated with a result of a query operation may be determined by the size of the result file. For example, when the cloud fetch mechanism is enabled, small results may be assigned the arrow result format. In contrast, large results may be assigned the cloud result format. If the driver node 550 determines that the result format associated with the requested query operation is the arrow result format, the driver node 550 extracts the result of the query operation from the manifest file and returns the result to the user in-line in the workspace environment. Conversely, if the driver node 550 determines that the result format is the cloud result format, the driver node 550 extracts the cloud storage file paths to the result files and instructs the data daemon module to generate a pre-signed URL directed to the result file location. The driver node 550 returns the pre-signed URL to the user in the workspace environment, which the user can use to fetch the result files.

Responsive to a cache read in the cloud storage query result cache 565, the driver node 550 also writes the results to the in-memory query result cache 555. In one instance, for small results, the driver node 550 writes the results of the query to the in-memory query result cache 555, and for large results, the driver node 550 writes the file paths to the result files of the query in cloud storage. In this manner, for the next request of the particular query, the driver node 550 is able to retrieve the query result from the in-memory query result cache 555 which can be faster in some instances as it is local memory to the cluster. Moreover, when the cluster including the driver node 550 is terminated and the in-memory cache is also destroyed for that cluster, the driver node of another cluster that share the same workspace, warehouse, etc., can share access to the cloud storage query result cache 565. In this manner, when the second cluster receives a query request that has been stored in the cloud storage, the driver node of the second cluster is able to retrieve the results from the appropriate manifest files and return to the user.

Write Operation to Remote Query Result Cache

Figure 5B:
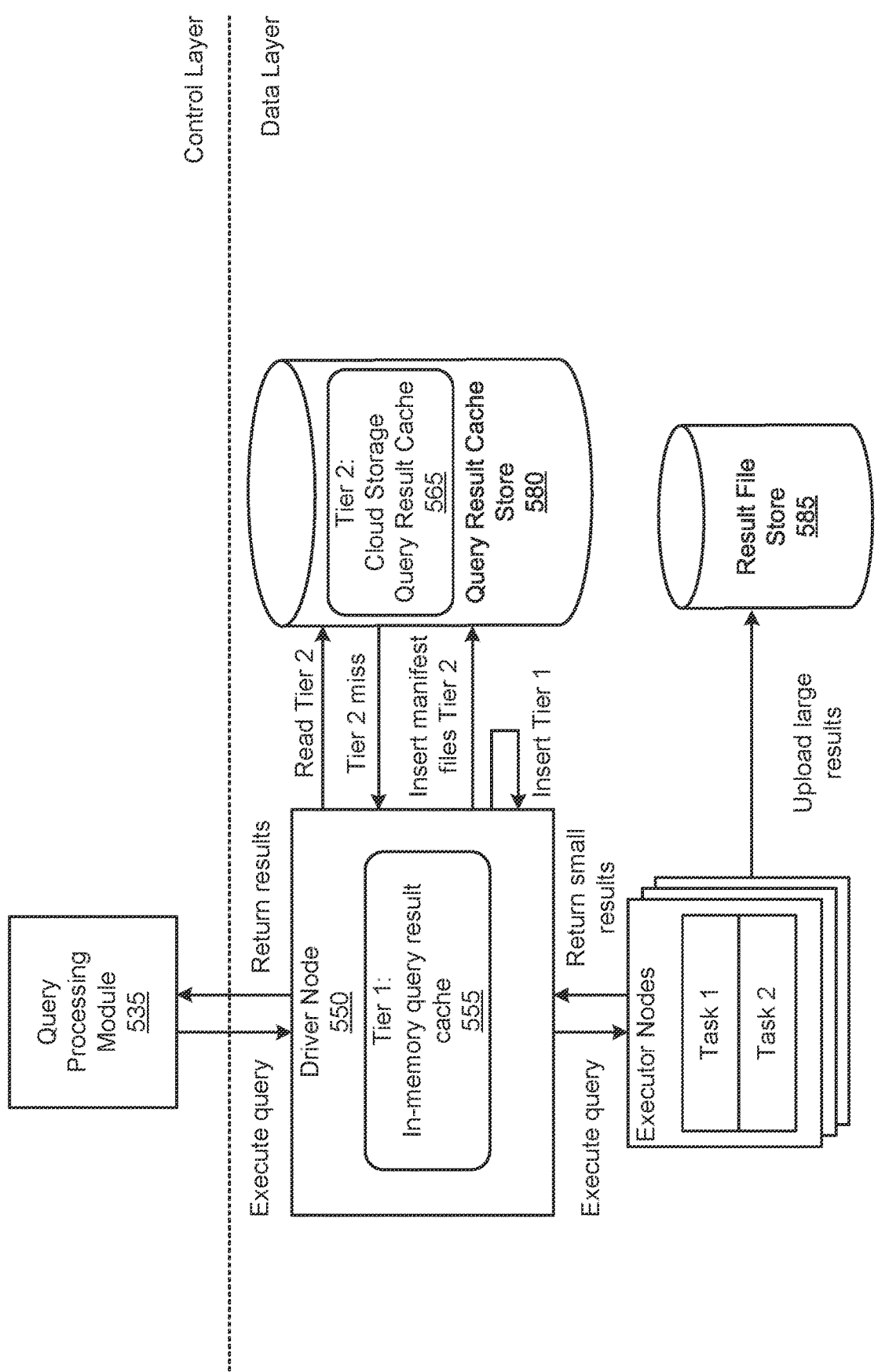
FIG. 5B is a conceptual diagram that illustrates a cache miss in both in-memory query result cache and cloud storage query result cache, in accordance with an embodiment.

FIG. 5B illustrates a cache miss in both in-memory query result cache and cloud storage query result cache, in accordance with an embodiment. The process described in FIG.

5A is repeated. The query processing module 535 assigns a requested query operation from a client device 116 to a cluster. The query processing module 535 may process and compile the database query and distribute one or more query operations to clusters in the data layer 108. The driver node 550 of the cluster receives a requested query operation from the query processing module 535 and generates a logical plan for the requested query operation. The driver node 550 generates a logical plan for the query operation and determines query caching eligibility. Query operations that are not eligible for caching in the query result caches may include query operations that use non-deterministic functions, query operations that reference data tables that are in non-delta formats, and query operations that include timestamps. This may include simple query operations that require the same computational resources to compute using the driver node 550 as caching them. In response to determining that a query operation is not cache eligible, the driver node 550 returns the result of the query operation to the client device and does not store the result to the in-memory query result cache 555 or the cloud storage query result cache 565.

The driver node 550 performs a first look up in the in-memory query result cache 555 using the logical plan of a requested query operation. However, the driver node 550 determines that data associated with result of the requested query operation is not present in the in-memory query result cache 555, as such, an in-memory query result cache 555 miss occurs. The driver node 550 subsequently performs a second look up in the cloud storage query result cache 565 using a hashed representation of the requested query operation. However, the driver node 550 determines that the data associated with result of the requested query operation is not present in the cloud storage query result cache 565, as such, a cloud storage query result cache 565 miss occurs.

In response, the driver node 550 sends the requested query operation to a set of executor nodes to be executed. The driver node 550 may divide the query operation into two or more jobs, and each job may be further divided into tasks. Each executor node may include one or more execution engines (not shown) for executing one or more tasks of a job stage. The executor node distributes one or more tasks for a job stage to the one or more execution engines.

The executor nodes execute the tasks and generate the result of the query operation. In one embodiment, the representation of the result returned to the client device may be based on the size of the result. For small results, the executor nodes may return the result to the driver node 550 in batches. The driver node 550 may assemble the result batches and return the result to the client device in-line. The result of the query operation may be stored directly in the in-memory query result cache 555. The driver node 550 may asynchronously upload the small result to the cloud storage query result cache 565 in one or more result files. The driver node 550 may generate a cache key using the logical plan of the query operation. The driver node 550 may generate a manifest file for the requested query operation upon determining the caching eligibility of the requested query operation, and store the results of the query operation, and metadata associated with the query operation within the manifest file. In some embodiments, the manifest file associated with a small result may contain fewer or additional data. The driver node 550 may store the manifest file in association with the generated cache key in the cloud storage query result cache 565, the cache key being the hashed representation of the logical plan of the query operation.

For large results, the executor nodes execute the query, and upload batches (e.g., Arrow batches) of the results to result files in the result file store 585. The driver node 550 obtains the result file paths and may provide the data daemon module with the file paths, such that the data daemon may generate a pre-signed URL directed to a location in the cloud storage from which the result may be downloaded. The driver node 550 returns the pre-signed URL to the client device. In addition, the file path to the result files may be stored in the in-memory query result cache 555. Similar to the process described above for small results, the driver node 550 may generate a manifest file for the requested query operation and store the cloud storage file paths to the result files of the query operation, and metadata associated with the query operation within the manifest file. In some embodiments, the manifest file associated with a large result may contain fewer or additional data. The driver node 550 may generate a cache key using the logical plan of the query operation. The driver node 550 may store the manifest file in association with the generated cache key in the cloud storage query result cache 565, the cache key being the hashed representation of the logical plan of the query operation.

While an embodiment in which the cache key for a manifest file associated with a query operation is generated based on a logical plan of the query operation, it is appreciated that in other embodiments, the cache key for the manifest files or the in-memory cache may be generated from any appropriate data related to a query operation that is capable of identifying a particular query operation. For example, the cache key may also be generated by hashing the physical plan or parts of the code generation process as described in detail in FIG. 6.

Figure 6:
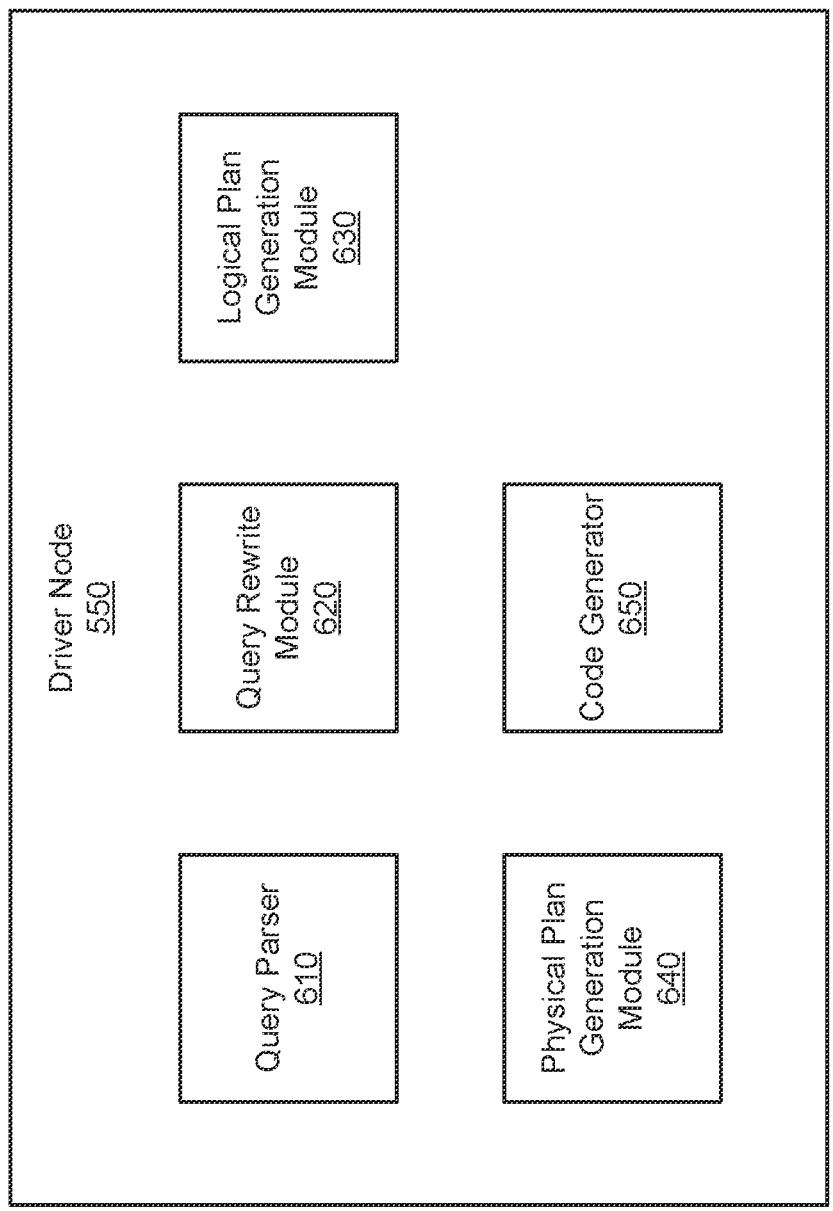
FIG. 6 is a block diagram of an architecture of a driver node, in accordance with an embodiment.

FIG. 6 is a block diagram of an architecture of a driver node 550, in accordance with an embodiment. In one instance, the driver node 550 includes a query parser 610, a query rewrite module 620, a logical plan generation module 630, and a physical plan generation module 640.

The query parser 610 receives a database query for processing and parses the database query. The database query is specified using a declarative database query language such as SQL. The query parser 610 parses the database query to identify various tokens of the database query and build a data structure representation of the database query. The data structure representation identifies various components of the database query, for example, any SELECT expressions that are returned by the database query, tables that are input to the query, a conditional clause of the database query, a group by clause, and so on. According to an embodiment, the data structure representation of the database query is a graph model based on the database query.

The query rewrite module 620 performs transformations of the database query, for example, to improve the execution of the query. The improvement may be in terms of execution time, memory utilization, or other resource utilization. A database query may process one or more tables that store a significant number of records that are processed by the database query. Since the declarative database query language does not specify the procedure for determining the result of the database query, there are various possible procedures for executing the database query. The query rewrite module 620 may transform the query to change the order of processing of certain steps, for example, by changing the order in which tables are joined, by changing the order in which certain operations such as filtering of records of a table is performed in relation to other operations. The query rewrite module 620 may transform the database query to cause certain temporary results to be materialized. The query rewrite module 620 may eliminate certain operations if the operations are determined to be redundant. The query rewrite module 620 may transform a database query so that certain computations such as subqueries or expressions are shared. The query rewrite module 620 may transform the database query to pushdown certain computations, for example, by changing the order in which certain predicates are applied to the computation as early as possible. The query rewrite module 620 may transform the database query to modify certain predicates to use more optimized versions of the predicates that are computationally equivalent but provide better performance.

The logical plan generation module 630 generates a logical plan for the database query. The logical plan includes representation of the various steps that need to be executed for processing the database query. According to an embodiment, the logical plan generation module 630 generates an unresolved logical plan based on the transformed query graph representation. Various relation names (or table names) and column names may not be resolved in an unresolved logical plan. The logical plan generation module 630 generates a resolved logical plan from the unresolved logical plan by resolving the relation names and column names in the unresolved logical plan. The logical plan generation module 630 further optimizes the resolved logical plan to obtain an optimized logical plan.

The physical plan generation module 640 generates a physical plan from the logical plan generated by the logical plan generation module 630. The physical plan specifies details of how the logical plan is executed by the data processing service 102. The physical plan generation module 640 may generate different physical plans for the same logical plan and evaluate each physical plan using a cost model to select the optimal physical plan for execution. The physical plan further specifies details of various operations of the logical plan. As an example, if the logical plan includes a join operator, the physical plan may specify the type of join that should be performed for implementing the join operator. For example, the physical plan may specify whether the join operator should be implemented as a hash join, merge join, or sort join, and so on. The physical plan may be specific to a database system, whereas the logical plan may be independent of database systems and may be executed on any target database system by converting to a physical plan for that target database system.

The code generator 650 generates code representing executable instructions for implementing the physical plan for executing a database query. The generated code includes a set of instructions for each operator specified in the execution plan. The generated code is specified using a programming language that may be compiled and executed.

Figure 7:
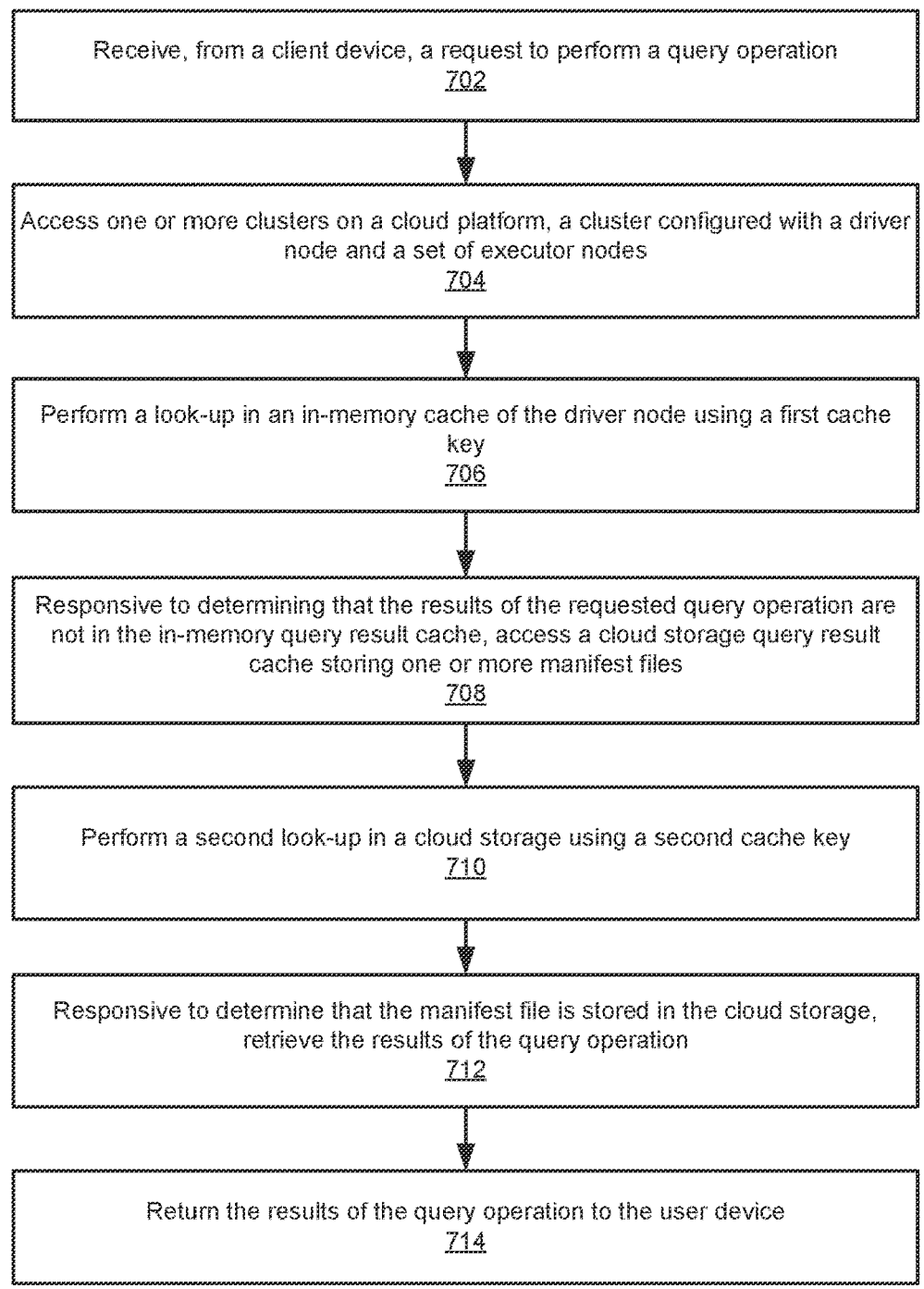
FIG. 7 is a flowchart illustrating a process for returning the results of a query operation to a client device during a cache miss in the in-memory query result cache and a cache hit in the cloud storage query result cache, in accordance with an embodiment.

FIG. 7 is a flowchart illustrating a process for returning the results of a query operation to a client device during a cache miss in the in-memory query result cache and a cache hit in the cloud storage query result cache, in accordance with an embodiment. The data processing service receives 702, from a client device, a request to perform a query operation. The query operation may be a database query and is defined by a set of operations on data from one or more data tables. The data tables may be stored in the data storage system 110A in the data layer of the tenant or a of a tenant or an external third-party data storage system 110B which is communicatively coupled to the data processing service 102 over the network 120.

The query processing module 535 in the control layer of the data processing service accesses 704 one or more clusters on the cloud platform, a cluster configured with a driver node 550 and a set of executor nodes. The query processing module 535 distributes the requested query operation to the appropriate cluster in the data layer to execute the query operation. The driver node 550 receives the requested query operation from the query processing module 535 and may provide the requested query operation to the query parser 610. As described in FIG. 6, the query parser 610 receives a database query for processing and parses the database query to identify various tokens of the database query and build a data structure representation of the database query. The driver node 550 may extract referenced data tables in the query operation, resolve delta table versions, and verify the user permissions for accessing the referenced tables. The driver node 550 may provide the parsed query operation to the query rewrite module 620 to performs transformations of the query operation, such as to perform query optimization. For example, the query rewrite module 620 may transform the query operation to change the order of processing of certain steps to improve processing efficiency. The logical plan generation module 630 generates a logical plan for the requested query operation, the logical plan including a representation of the various steps that need to be executed for processing the database query. According to an embodiment, the logical plan generation module 630 generates an unresolved logical plan based on the transformed query graph representation generated by the query rewrite module 620. As described in FIG. 6, the logical plan generation module 630 generates a resolved logical plan from the unresolved logical plan and may further optimize the resolved logical plan to obtain an optimized logical plan. The logical plan may be used as a first cache key, the first cache key used to associate a query operation and a cache entry in the in-memory query result cache 555 which contains the data associated with the results of the query operation.

The driver node performs 706 a look up in the in-memory query result cache of the driver node using a first cache key to determine whether the data associated with the results of the requested query operation is stored in the in-memory query result cache 555. The data associated with the results of the requested query operation may include the result of the requested query operation or the result file store 585 file path to the result file. In response 708 to determining that the results of the requested query operation are not in the in-memory query result cache 555, the driver node accesses a cloud storage query result cache 565, which stores one or more manifest files. A manifest file may contain the result of a query operation, a result file store 585 file path to a result file associated with the query operation, and metadata associated with the result of the query operation. In some embodiments, the contents of the manifest file may be determined by the size of the result file. Manifest files that are associated with small results may directly store the result of the query operation, while manifest files associated with large results may store the result file store 585 file paths which direct to the location of the result file. The manifest file may be named using a second cache key. In some embodiments, the second cache key may be a hashed representation of the logical plan of the query operation. The driver node 550 may apply a hash function on the logical plan of the requested query operation to determine the second cache key.

The driver node performs 710 a second look up in the cloud storage query result cache using the second cache key. Responsive 712 to determine that the manifest file is stored in the cloud storage query result cache, the driver node retrieves the results of the query operation. The driver node downloads the manifest file from cloud storage query result cache 565 and reads the result format from the manifest file. As described in FIG. 5A, the result format indicates the representation of the result that is returned to the user. If the driver node 550 determines the manifest file indicates the arrow result format, the driver node extracts the result of the query operation from the manifest file and returns 714 the result to the user inline in the workspace environment. In some embodiments, the driver node 550 extracts the result file store 585 file path to the result file from the manifest file and instructs the data daemon module to generate a pre-signed URL directed to the result file location. The driver node 550 may download the result file and return the result to the client device inline. In contrast, if the driver node 550 determines the manifest file indicates the cloud result format, the driver node 550 extracts the result file store 585 file path to the result file and instructs the data daemon module to generate a pre-signed URL directed to the result file location. The driver node returns 714 the pre-signed URL to the user in the workspace environment, which the user can use to fetch the result files.

Figure 8:
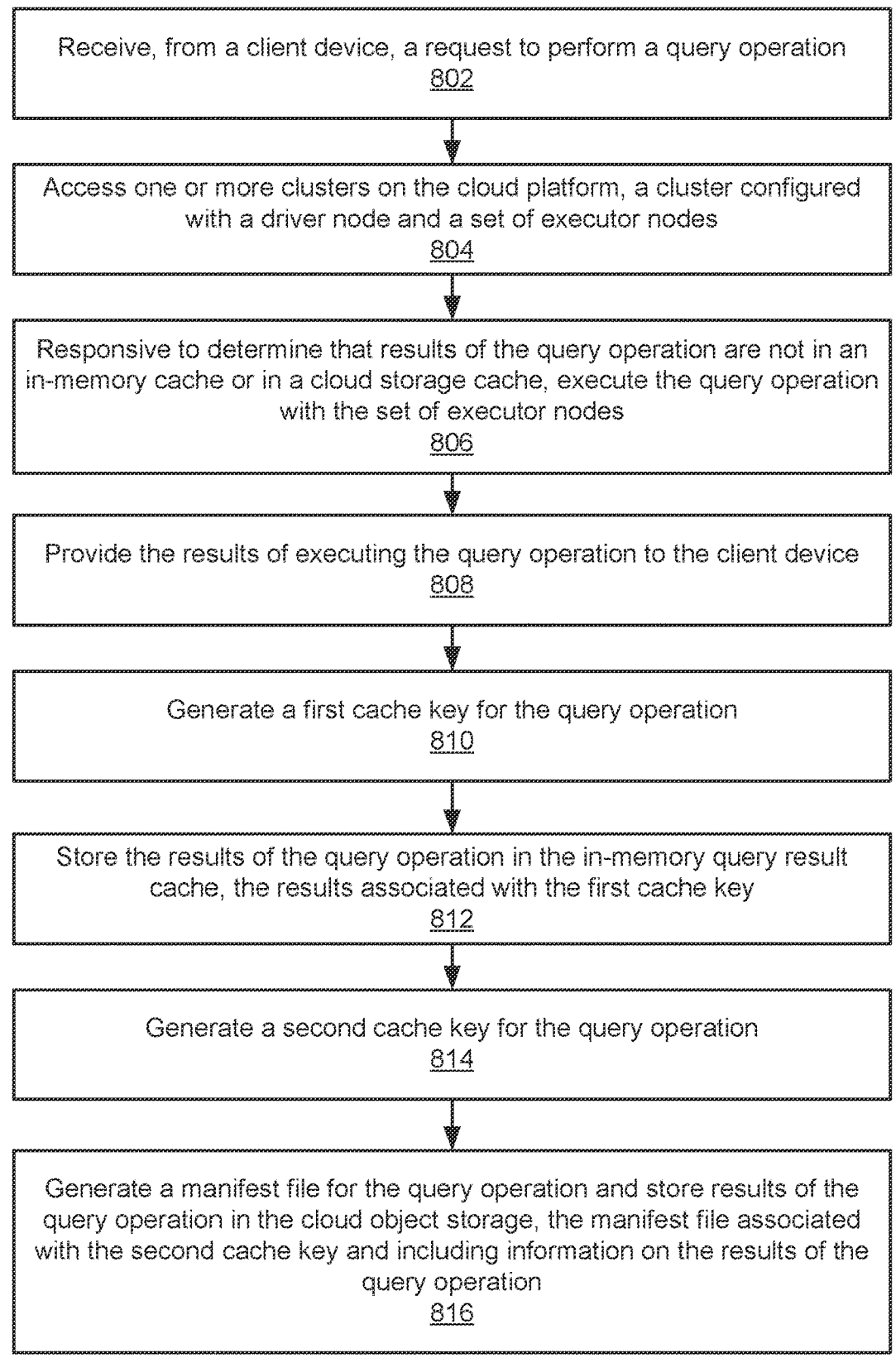
FIG. 8 is a flowchart illustrating a process for returning the results of a query operation to a client device after a cache miss in both in-memory query result cache and cloud storage query result cache, in accordance with an embodiment.

FIG. 8 is a flowchart illustrating a process for returning the results of a query operation to a client device after a cache miss in both in-memory query result cache and cloud storage query result cache, in accordance with an embodiment. The data processing service receives 802, from a client device, a request to perform a query operation. The query processing module 535 in the control layer of the data processing service accesses 804 one or more clusters on the cloud platform, a cluster configured with a driver node 550 and a set of executor nodes. Similar to the process described in FIG. 7, the query processing module 535 distributes the requested query operation to the appropriate cluster in the data layer to execute the query operation. The driver node 550 receives the requested query operation from the query processing module 535 and may provide the requested query operation to the query parser 610. The driver node 550 provides the parsed query operation to the query rewrite module 620 to performs transformations of the query operation, such as to perform query optimization. The logical plan generation module 630 generates a logical plan for the requested query operation, the logical plan including a representation of the various steps that need to be executed for processing the database query. The caching eligibility of the query operation is determined. The logical plan may be used as a first cache key, the first cache key used to associate a query operation and a cache entry in the in-memory query result cache 555 which contains the data associated with the results of the query operation.

The driver node performs a first look up in the in-memory query result cache of the driver node using a first cache key. In response to determining that the results of the requested query operation are not in the in-memory query result cache 555, the driver node accesses the cloud storage query result cache 565 and performs a second look up using a second cache key. The second cache key may be the hashed representation of the logical plan. The driver node determines that the results of the query operation are not present in the in-memory query result cache or in the cloud storage query result cache. In response 806, the driver node executes the query operation with the set of executor nodes. The driver node may generate, using the physical plan generation module 640, a physical plan from the logical plan. The driver node may generate, using the code generator 650, code representing executable instructions for implementing the physical plan for executing the query operation. The generated code includes a set of instructions for each operator specified in the execution plan. The driver node may provide the executable instructions to the executor nodes for execution. The executable instructions may be associated with a task for a corresponding job stage. The executor nodes may distribute one or more tasks for a job stage among one or more execution engines for execution.

The driver node provides 808 the results of executing the query operation to the client device. As described in FIG. 5B, the representation of the result returned to the client device may be based on the size of the result. For small results, the executor nodes may return the result to the driver node in batches. The driver node may assemble the result batches and return the result to the client device inline. For large results, the executor nodes execute the query, and upload batches (e.g., Arrow batches) of the results to result files in the result file store 585. The driver node 550 may obtain the result file paths and provide the data daemon module with the result file store 585 file paths to the result files of the requested query operation. The data daemon module may generate a pre-signed URL directed to a location in the result file store 585 from which the result may be downloaded. The driver node returns the pre-signed URL to the client device.

The driver node generates 810 a first cache key for the query operation. The first cache key may be generated using the logical plan of the query operation. The driver node 550 stores 812 the results of the query operation in the in-memory query result cache, the results associated with the first cache key. For small results, the driver node 550 stores the results of the query operation directly in the in-memory query result cache. The driver node 550 may asynchronously upload the small result to the cloud storage query result cache. While for large results, the driver node 550 stores the file paths to the result files in the in-memory query result cache 555.

The driver node generates 812 a second cache key for the query operation. As described in FIG. 7, the driver node 550 determines the second cache key by applying a hash operation to the logical plan of the query operation.

The driver node generates 814 a manifest file for the query operation and stores the results of the query operation in cloud storage query result cache 565. The driver node 550 may request, from the data daemon module, a pre-signed URL directed to a location in the cloud storage query result cache 565 for the driver node 550 to upload the manifest file to the cloud storage query result cache 565. The driver node 550 may asynchronously upload the manifest file to the cloud storage query result cache 565 using the pre-signed URL.

Figure 9:
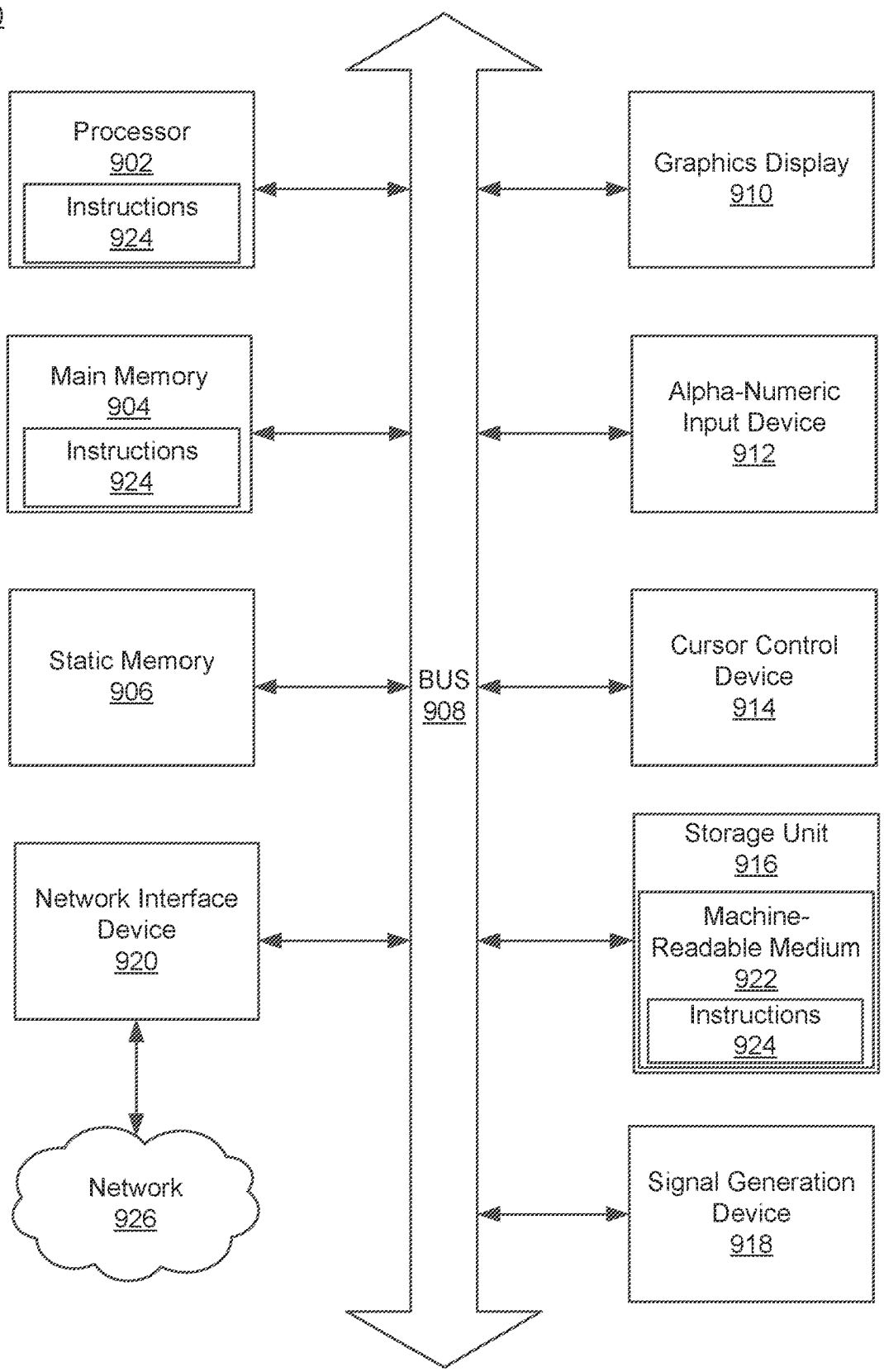
FIG. 9 is a block diagram illustrating an example machine to read and execute computer readable instructions, in accordance with an embodiment.

Turning now to FIG. 9, illustrated is an example machine to read and execute computer readable instructions, in accordance with an embodiment. Specifically, FIG. 9 shows a diagrammatic representation of the data processing service 102 (and/or data processing system) in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 900. The computer system 900 also includes a main memory 904. The computer system may include a storage unit 916. The processor 902, memory 904, and the storage unit 916 communicate via a bus 908.

In addition, the computer system 900 can include a static memory 906, a graphics display 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. For example, the instructions 924 may include instructions for implementing the functionalities of the transaction module 330 and/or the file management module 335. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926, such as the network 120, via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configurations beneficially provide a method (and/or a system) for resolving concurrent transactions using deletion vectors. Without deletion vectors, concurrent transactions may fail to commit due to the conflicts introduced by intervening transactions, and the current transaction typically will have to start over from the most current version of the data table, resulting in wasted computing resources and time. By resolving concurrent conflicts in conjunction with deletion vectors associated with data files, the method presented herein may determine the serializability of the concurrent transactions and prevent many transaction operations from failing and having to be started over again, saving resources and cost for both the data processing service and the users of the data processing service.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A method comprising:
   receiving, from a user device, a request to perform a query operation, the query operation defined by a set of operations on data from one or more data tables;
   accessing one or more clusters on a cloud platform, a cluster configured with a driver node and a set of executor nodes;
   determining a cache key for the query operation;
   performing a look-up in an in-memory cache of the driver node to determine whether results of the requested query operation is stored in the in-memory cache;
   responsive to determining that the results of the requested query operation are not in the in-memory cache, accessing a cloud storage storing one or more manifest files;
   performing a second look-up in the cloud storage to determine whether a manifest file for the requested query operation is stored based on the cache key for the query operation;
   retrieving, responsive to determining that the manifest file is stored, information on the results of the query operation by reading the manifest file; and
   returning the results of the query operation or information for retrieving the results of the query operation to the user device.

2. The method of claim 1, further comprising:
   generating, by the driver node, a logical plan using the query operation, wherein the logical plan comprises a representation of executable steps for processing the query operation; and
   generating, using the logical plan, the cache key of the query operation.

3. The method of claim 2, the cache key used to perform the second look-up in the cloud storage computed, by the driver node, using a hash function on the logical plan, and a name of the manifest file including the cache key.

4. The method of claim 1, the manifest file for the requested query operation is associated with a result format, the result format determined by a size of the result of the query.

5. The method of claim 4, wherein the result format of the manifest file is an in-line format for a small query result, and the manifest file includes paths to result files including the results of the query operation, and returning the results comprises providing the results of the query operation in the result files in-line in an interface on the user device.

6. The method of claim 4, wherein the result format of the manifest file is a cloud format for a large query result, and the manifest file includes paths to result files including the results of the query operation, and returning the results comprise generating pre-signed Uniform Resource Locators (URLs) to the result files and providing the pre-signed URLs in an interface on the user device.

7. The method of claim 1, further comprising storing the results of the query operation or information on the results of the query operation in the in-memory cache.

8. A computer system, comprising:
   one or more computer processors, and
   one or more memories comprising stored instructions that when executed by the one or more computer processors causes the computer system to:
      receive, from a user device, a request to perform a query operation, the query operation defined by a set of operations on data from one or more data tables;
      access one or more clusters on a cloud platform, a cluster configured with a driver node and a set of executor nodes;
      determine a cache key for the query operation;
      perform a look-up in an in-memory cache of the driver node to determine whether results of the requested query operation are stored in the in-memory cache;
      responsive to determining that the results of the requested query operation are not in the in-memory cache, accessing a cloud storage storing one or more manifest files;
      perform a second look-up in the cloud storage to determine whether a manifest file for the requested query operation is stored based on the cache key for the query operation;
      retrieve information on the results of the query operation by reading the manifest file if the manifest file is stored; and
      return the results of the query operation or information for retrieving the results of the query operation to the user device.

9. The computer system of claim 8, further comprises instructions that when executed by the computer processor, cause the computer processor to:
   generate, by the driver node, a logical plan using the query operation, wherein the logical plan comprises a representation of executable steps for processing the query operation; and
   generate, using the logical plan, the cache key of the query operation.

10. The computer system of claim 9, the instructions to perform the second look-up in the cloud storage further comprises instructions to compute the cache key, using a hash function on the logical plan, and a name of the manifest file including the cache key.

11. The computer system of claim 10, the manifest file for the requested query operation is associated with a result format, the result format determined by a size of the result of the query.

12. The computer system of claim 11, wherein the result format of the manifest file is an in-line format for a small query result, and the manifest file includes paths to result files including the results of the query operation, and returning the results comprises provide the results of the query operation in the result files in-line in an interface on the user device.

13. The computer system of claim 12, wherein the result format of the manifest file is a cloud format for a large query result, and the manifest file includes paths to result files including the results of the query operation, and returning the results comprise generate pre-signed URLs to the result files and providing the pre-signed URLs in an interface on the user device.

14. The computer system of claim 8, further comprises stored instructions that when executed by the one or more processors, cause the computer system to store the results of the query operation or information on the results of the query operation in the in-memory cache.

15. A non-transitory computer-readable medium comprising stored instructions that, when executed by one or more processors, cause the one or more processors to:
  receive, from a user device, a request to perform a query operation, the query operation defined by a set of operations on data from one or more data tables;
  access one or more clusters on a cloud platform, a cluster configured with a driver node and a set of executor nodes;
  determine a cache key for the query operation;
  perform a look-up in an in-memory cache of the driver node to determine whether results of the requested query operation are stored in the in-memory cache;
  access a cloud storage storing one or more manifest files if the results of the requested query operation are not in the in-memory cache;
  perform a second look-up in the cloud storage to determine whether a manifest file for the requested query operation is stored based on the cache key for the query operation;
  retrieve, responsive to determining that the manifest file is stored, information on the results of the query operation by reading the manifest file; and
  return the results of the query operation or information for retrieving the results of the query operation to the user device.

16. The non-transitory computer-readable medium of claim 15, further comprises instructions that when executed by a computer processor, cause the computer processor to:
  generate, by the driver node, a logical plan using the query operation, wherein the logical plan comprises a representation of executable steps for processing the query operation; and
  generate, using the logical plan, the cache key of the query operation.

17. The non-transitory computer-readable medium of claim 16, the instructions to perform the second look-up in the cloud storage further comprises instructions to compute the cache key, by the driver node, using a hash function on the logical plan, and a name of the manifest file including the cache key.

18. The non-transitory computer-readable medium of claim 17, the manifest file for the requested query operation is associated with a result format, the result format determined by a size of the result of the query.

19. The non-transitory computer-readable medium of claim 18, wherein the result format of the manifest file is an in-line format for a small query result, and the manifest file includes paths to result files including the results of the query operation, and returning the results comprises provide the results of the query operation in the result files in-line in an interface on the user device.

20. The non-transitory computer-readable medium of claim 18, wherein the result format of the manifest file is a cloud format for a large query result, and the manifest file includes paths to result files including the results of the query operation, and returning the results comprise generate pre-signed URLs to the result files and providing the pre-signed URLs in an interface on the user device.

* * * * *